United States Patent

Sullivan

[15] 3,638,993
[45] Feb. 1, 1972

[54] CANOPY FOR VEHICLES

[72] Inventor: John R. Sullivan, 4286 Bennion Road, Salt Lake City, Utah 84119

[22] Filed: Dec. 12, 1969

[21] Appl. No.: 884,403

[52] U.S. Cl. ..........................................296/95 R
[51] Int. Cl. ..............................................B60j 7/00
[58] Field of Search ..............296/95 R, 99, 137; 135/7.1 A, 135/5 A, 1 A; 211/151; 224/42.1 E

[56] References Cited

UNITED STATES PATENTS

| 1,395,129 | 10/1921 | McCorkindale | 296/99 X |
| 1,944,439 | 1/1924 | Larsen | 296/137 B X |
| 2,140,960 | 12/1938 | Kercher | 296/137 B |
| 2,757,043 | 7/1956 | Strick et al. | 296/137 B |
| 2,889,097 | 6/1959 | Broehl | 211/151 X |

FOREIGN PATENTS OR APPLICATIONS

| 77,437 | 1/1962 | France | 224/42.1 E |
| 561,849 | 4/1957 | Italy | 296/95 |

OTHER PUBLICATIONS

DAS 1,247,886, German Printed Application, 8/1967, Dotzquer, 135–5A (1 sht. dwg.– 4pp. spec.)

*Primary Examiner*—Benjamin Hersh
*Assistant Examiner*—John A. Pekar

[57] ABSTRACT

A device for installation on pickup trucks and the like, having a forwardly and rearwardly slidable top member, the top member serving to prevent snow and ice from adhering to the windshield. This device includes a pair of rails in which roller assemblies are carried to allow for the smooth positioning of the top member and the rails are secured to side frames that are bolted in a suitable manner to the truck body.

3 Claims, 5 Drawing Figures

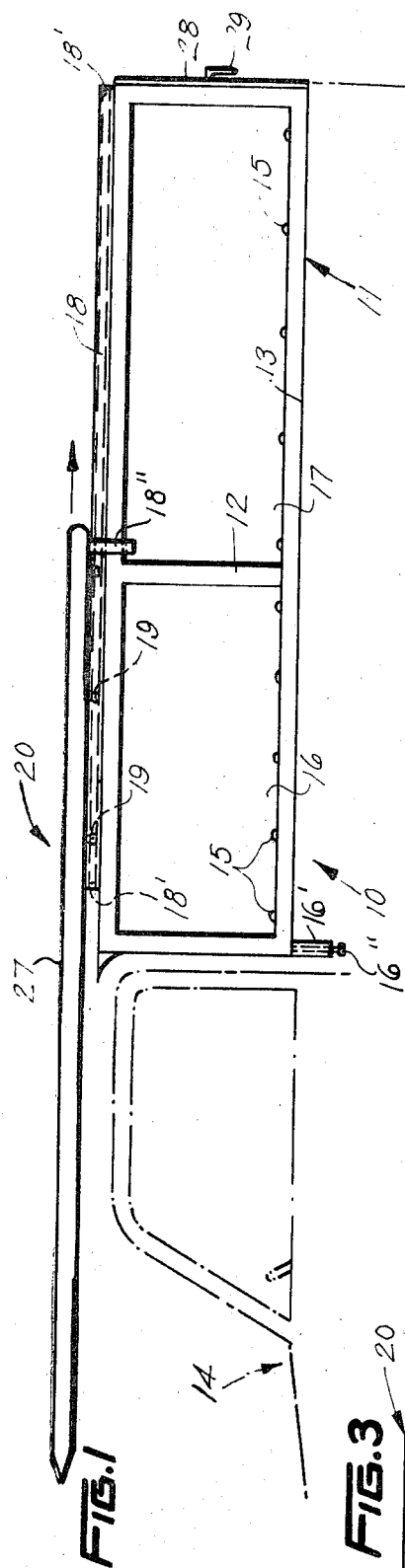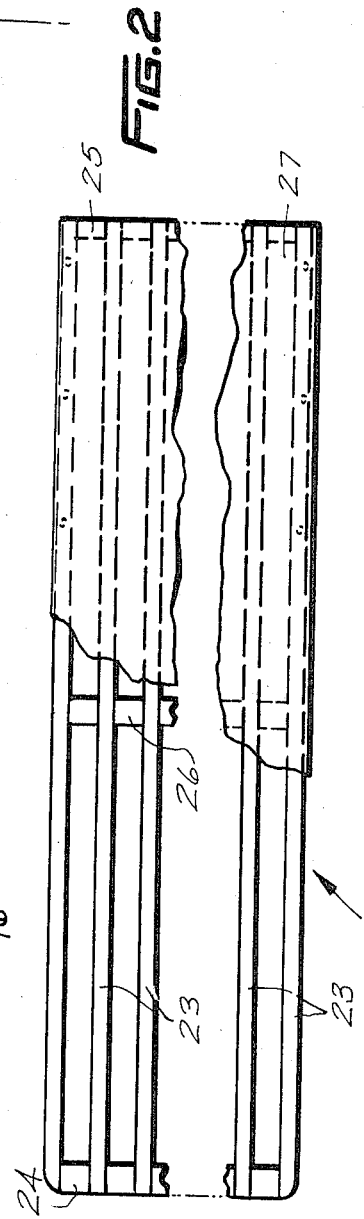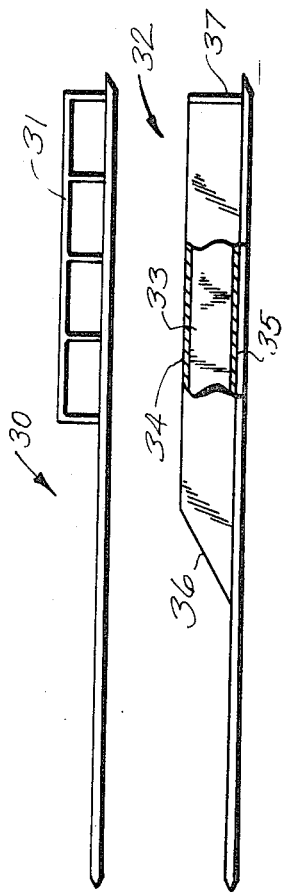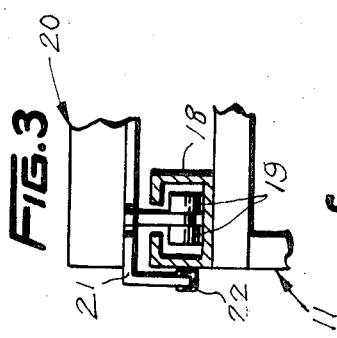
INVENTOR.
JOHN R. SULLIVAN

CANOPY FOR VEHICLES

This invention relates to protective covering devices, and more particularly to a slidable canopy for vehicles.

It is a primary object of the present invention to provide a canopy for vehicles which will protect the cab and body portion of the pickup trucks and the like.

Another object of this invention is to provide a canopy, the base of which will be a framelike structure that is secured fixedly to the body of the truck while the upper top member will have a plurality of roller assemblies that will be carried within channeled rails on top of the frame of the device.

A further object of this invention is to provide a device of the type described which will also serve to protect the cab portion of the truck from the sun in order that the driver of the vehicle will be comfortable, the top member being spaced apart from the top of the cab portion of the vehicle to allow for air circulation and better cooling of the cab portion of the vehicle.

A still further object of this invention is to provide a canopy for vehicles which will have a top member that is light in weight so as to easily move and the side frame portions of the device may include panels and the rear may include a hinged door or the like, the front portion of the device being open or closed by panel means.

Other objects of the present invention are to provide a canopy for vehicles which is simple in design, inexpensive to manufacture, rugged in construction, easy to use and efficient in operation.

These and other objects will be readily evident upon a study of the following specification and the accompanying drawing wherein:

FIG. 1 is a side view of the present invention showing the top member urged forward with a fragmentary representation of the pickup truck shown in phantom lines;

FIG. 2 is a fragmentary top plan view of the top member of the device shown removed from the frame portion shown in FIG. 1 with the roller assemblies also shown removed therefrom;

FIG. 3 is a fragmentary end view of the device showing the roller assemblies, with one of the side positioned channels, and the weather shield;

FIG. 4 is a side elevation showing a modified and interchangeable top member for the present invention; and FIG. 5 is a side elevation showing another modified form of top member which is interchangeable, with the side portions being broken away to illustrate the interior of the device.

According to this invention, a canopy 10 for vehicles is shown to include a pair of rectangular configurated frames 11 having a brace 12. Frames 11 are secured to the upper portion of the body 13 of a pickup truck 14 by suitable bolt fasteners 15 or the like including nut fasteners (not shown). The braces 12 of frames 11 define rectangular openings 16 and 17 which may or may not be panelled. A pair of parallel-spaced apart channeled rails 18 are fixedly secured to the upper portion of frames 11 of canopy 10 by suitable fastening means (not shown).

Within channeled members 18 are a plurality of roller assemblies 19 which are secured to the underside of the elongated and movable top member 20. To the underside of movable top member 20 is a weather shield 21 having a rubber portion 22, shield 21 serving to prevent water spray from entering channel 18.

It shall be noted that the roller assemblies and channel members 18 may be made of nylon or other suitable plastic material in order to prevent corrosion thereof.

It shall also be noted that the channel members 18 are provided with endpieces 18' in order to prevent the overtravel of top member 20.

Top member 29 is a rectangular configuration and includes a plurality of parallel-spaced apart strips 23 which are secured to a front crossmember 24 and a rear crossmember 25, a center brace 26 being secured to the outer strips 23. Top member 20 is covered by a suitable covering 27 of lightweight material as desired. Canopy 10 may also include a hingeable door 28 having a handle 29 which allows it to be opened by pivoting the door 28 to the right.

In use, top member 20 is urged forward so that it overhangs the cab portion of truck 14, this overhanging portion being spaced apart from the cab top so that there is airspace for preventing heat from being transferred to the cab portion of truck 14. When the overhanging portion of top member 20 is brought fully forward against the stop member of channel members 18 canopy 10 thus protects the cab portion from the weather. When top 20 is moved forwardly of the base portion of canopy 10 the roller assemblies 19 remain confined within the channel 18.

Looking now at FIG. 4 of the drawing, one will see a modified top member 30 having a carrier frame 31 which allows additional car loads to be carried by truck 14 and top 30 is interchangeable with top 20.

Looking now at FIG. 5 of the drawing, one will see another modified top member 32 having sidewalls 33, a top wall 34 and a bottom wall 35, an inclined front wall 36 and a hinged door 37. Top member 32 is interchangeable with top members 20 and 30, by removing the stop portions 18' of the rails 18.

It shall be noted that a secondary stop member 18" attached to each side of crossmember 25 will prevent a load of snow on member 20 from applying too much pressure to the rollers 19. The secondary stop members 18" also provides a place for positioning locks (not shown) on each side in order to keep member 20 stationary.

It shall further be noted that a stake member 16' and its associated bolt 16" is secured on each side of the front end of member 11 and provides a main anchor for device 10 when truck 14 is driven with member 20 in its protective position, this preventing possible rupture because of the strong lift force effected at this point of device 10.

It shall also be recognized that device 10 may have the member 20 electrically or hydraulically moved by having minor structural changes effected.

What I now claim is:

1. A protective canopy for vehicles comprising a frame base member for securement to the body portion of pickup trucks and the like, a forwardly and rearwardly movable top member including covering means for protecting the cab portion of said vehicle, and rail means carried by said base frame providing enclosure and guide means for roller assemblies carried by said top member, said base frame comprising a pair of elongated rectangular frames with crossbar means for holding the upper extremity secure, the lower extremity of said frame being secured by suitable fasteners to the truck body, the upper portion of said frames including said rail means, said rail means including elongated channel members, said channel members carrying said roller assemblies of said top member of said canopy device, said channel members of said device serving to confine said roller assemblies so that said top member will remain parallel with said channel members, said top portion when moved forward overhanging the cab portion of said truck to prevent the formation of ice and snow as well as reducing the heat normally encountered when said vehicle is in a hot sun, and said top including a rear portion thereof extending upwardly and including upstanding sidewalls, a top and bottom wall, and a front end wall as well as a rear hingeable door.

2. The combination according to claim 1, wherein said canopy includes secondary stop members at the rear of said top member, said secondary stop members being secured to a rear cross brace member of said top member, the opposite end hookingly engaging a portion of said frame members of said device, said secondary stop members at each side of said device providing a means of reducing the pressure upon said rollers of said device and also providing positioning means for locks on each side of said device to render it stationary in place when desired.

3. The combination according to claim 2, wherein anchor means for said device at its forward end of said frame includes a pair of stakes, said stakes having bolt means to anchor said device stationary when said top member is in its protective position.

* * * * *